Oct. 4, 1932.  F. LJUNGSTROM  1,881,234

VARIABLE SPEED POWER TRANSMISSION

Original Filed Sept. 8, 1927

INVENTOR
Fredrik Ljungström
BY
his ATTORNEY

Patented Oct. 4, 1932

1,881,234

UNITED STATES PATENT OFFICE

FREDRIK LJUNGSTROM, OF LIDINGO, SWEDEN, ASSIGNOR, BY MESNE ASSIGNMENTS, TO PED, INCORPORATED, OF NEW YORK, N. Y., A CORPORATION OF DELAWARE

VARIABLE SPEED POWER TRANSMISSION

Continuation of application Serial No. 218,293, filed September 8, 1927, and in Sweden February 16, 1927. This application filed November 18, 1931. Serial No. 575,801.

This application is a continuing application with respect to my copending application Serial No. 218,293 filed September 8, 1927 and is to be considered as relating back to said application, with respect to all subject matter herein continued, for all dates and rights incident to the filing of said application Serial No. 218,293 and applications corresponding thereto filed in foreign countries.

The present invention relates to variable speed power transmissions and has particular reference to variable speed power transmissions of the type capable of providing, alternatively, synchronous and asynchronous drive between a driving member and a driven member, which type of drive I will hereinafter refer to as synchronous-asynchronous drive. Still more particularly the invention relates to variable speed power transmissions providing synchronous-asynchronous drive of the type in which asynchronous drive is provided by converting a uni-directional torque or turning moment to turning moments of alternate opposite sense or direction and selectively transmitting turning moments of one sense to a driven member and of the opposite sense to an abutment, and in which synchronous drive is provided by transmitting the uni-directional torque or turning moment of the driving member to the driven member without altering, in the transmission, its uni-directional characteristic.

In transmissions of the above defined character, the turning moments, which, during periods of asynchronous drive, are directed toward an abutment, usually the transmission casing, tend to cause undesirable vibration of the transmission due to the intermittent character of the turning moments.

The primary object of the present invention is to provide improved means for altering the force characteristic of such turning moments so that a force of relatively even value is transmitted to the transmission abutment, whereby to substantially eliminate vibration in the transmission due to such forces.

Other and more detailed objects of the invention, together with the advantages to be derived from its use, may best be understood from a consideration of the following description of suitable apparatus for carrying the invention into effect, which apparatus is illustrated in the accompanying drawing forming a part of this specification.

Figures 1, 2, 3:
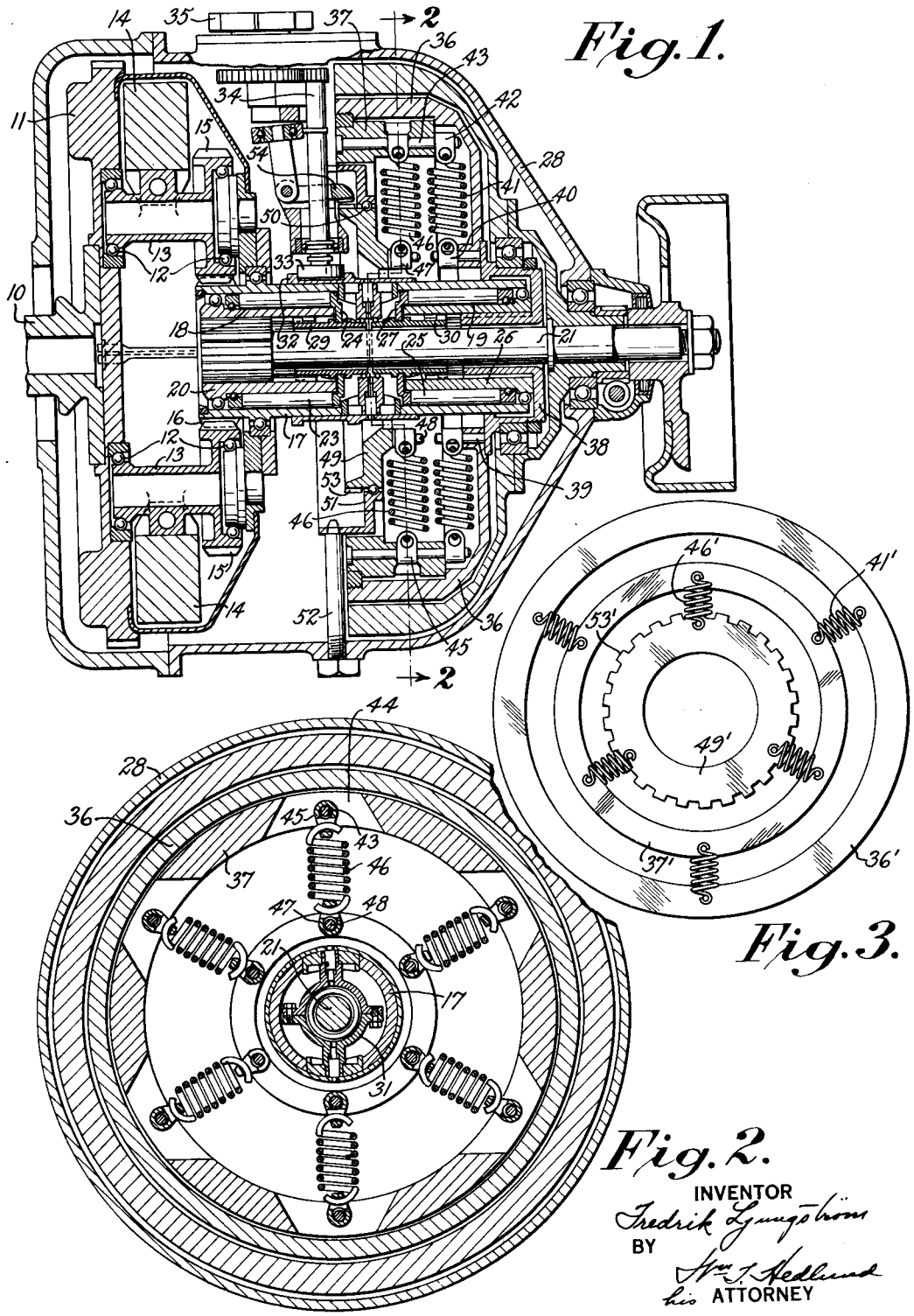
Fig. 1 is a central longitudinal section of a transmission embodying the invention.
Fig. 2 is a section taken on the line 2—2 of Fig. 1.
Fig. 3 is a more or less diagrammatic illustration of the relation of parts constituting the present improvement.

Referring now to Fig. 1, reference character 10 designates a driving member which may, for example, be the crank shaft of an internal combustion engine. Shaft 10 has fixed thereto a hollow fly-wheel 11 having mounted therein as by means of the ball bearings 12 a plurality of stub shafts 13. Each shaft 13 has mounted thereon, eccentrically with respect to the axis of rotation of the shaft, an inertia weight or mass 14, and also has fixed thereto a planetary pinion 15.

The several planetary pinions 15 engage a common centrally disposed gear 16 fixed on a rotatably mounted sleeve 17 which constitutes what may be termed the intermediate member of the transmission. Sleeve 17 has associated therewith, in the embodiment illustrated, two overrunning one-way clutches designated generally at 18 and 19, one of which, hereinafter termed an action clutch, is adapted to transmit turning moments of one sense from the intermediate member to the driven member of the transmission and the other of which, hereinafter termed the reaction clutch, is adapted to direct turning moments of opposite sense from the intermediate member toward the abutment. The action clutch 18 comprises the left hand portion of sleeve 17, a sleeve 20 rotatably mounted within sleeve 17 and fixed to the driven member 21 of the transmission, and a plurality of roller detents 23 between the two sleeves. The confronting surfaces of the sleeves, which are formed with gripping surfaces, provide a plurality of axially extending pockets in each of which is located a roller 23. Rollers 23 are mounted in a cage 24 and the rotational position of adjustment of the rollers with respect to the gripping surfaces permits the rollers to grip and release so that the clutch will grip upon force transmission in one direction of rotation through sleeve 17 and overrun upon force transmission through sleeve 17 in the opposite direction of rotation.

The reaction clutch 19 is similar in construction to the action clutch 18 and comprises a series of roller detents 25 situated between confronting gripping surfaces formed on the right hand portion of sleeve 17 and an inner sleeve 26 rotatably mounted with respect to sleeve 17. The position of rotational adjustment of rollers 25 is controlled by the position of the cage 27 in which they are mounted.

Sleeve 26 of the reaction clutch 19 has a certain amount of relative rotational movement with respect to the transmission casing 28 but is prevented from rotating, during normal operation of the transmission, by means hereinafter to be more fully described. For the moment sleeve 26 may be considered as rotationally fixed.

The action and reaction clutches, each of which is adapted to grip in one direction and overrun in opposite direction, are normally adjusted, by adjustment of the positions of the roller cages 24 and 27, so that the action clutch grips in one direction and the reaction grips in the opposite direction. For example, if the action clutch is adjusted so that the clutch acts to transmit clockwise turning movement (as viewed from the left in Fig. 1) from sleeve 17 to the driven member 21, the reaction clutch is set so that it directs force in counter-clockwise direction from sleeve 17 toward the abutment provided by the transmission casing 28.

The adjustment of the positions of the roller cages 24 and 27 is advantageously effected by means of longitudinally movable shift sleeves 29 and 30 connected by means of the spider 31 to the shift sleeve 32. Shift sleeve 32 is also longitudinally movable and movement thereof to effect adjustment of the positions of the roller cages is effected by the eccentric end 33 of a reversing shaft 34, the latter being turned through the medium of suitable gearing connected to an exterior operating member 35 in the form of a ratchet wheel. By suitably arranging the clutch adjusting mechanism, the action and reaction clutches may be synchronously reversed so that the action clutch will act to transmit force in counter-clockwise direction (as viewed from the left in Fig. 1) and the reaction clutch will act to transmit force in clockwise direction.

The general principle of operation of the transmission is as follows:

Assuming that the driven member 21 is stationary, rotation of the driving shaft 10 causes the inertia masses 14 to be rotated about their individual axes because of the engagement of the pinions 15 with the stationary gear 16. Rotation of the masses 14 about their own axes causes the production of turning moments of alternate opposite sense, due to centrifugal force generated by rotation of the inertia masses, and the application of the produced opposite turning moments to the intermediate sleeve 17. This action tends to cause sleeve 17 to oscillate. The turning moments of one sense are transmitted by the action clutch to the driven member and tend to make the driven member rotate due to the application thereto of a series of intermittent turning moment impulses of the same sense. The alternate turning moments of opposite sense are transmitted through the reaction clutch 19 and, as we have assumed, if the sleeve 26 is rotationally fixed, these opposite turning moments will be absorbed and rotation of the intermediate member in the direction of the opposite turning moments will be prevented. Thus it will be seen that the turning moments are in effect selectively applied to the driven member and to the abutment to effect motion in one direction of the driven member. This operation effects asynchronous drive.

Synchronous drive is effected when the centrifugal force generated by rotation of the inertia masses 14 is sufficient to overcome the resistance to movement of the driven shaft and the intermediate member and accelerate them so that their speed is synchronized with the sped of the fly-wheel 11. Under this condition of drive the inertia masses assume the positions shown in Fig. 1 and cease to rotate about their own individual axes. They rotate about the central axis of the transmission and cause application to the intermediate member of a continuous turning moment which is in turn transmitted by the action clutch to the driven member. This condition provides synchronous drive through the transmission and during periods of synchronous drive the reaction clutch is not utilized, there being produced no turning moments of a sense opposite the sense of direction of drive.

The mechanism hereinabove described in a general way and more or less diagrammatically illustrated, is known and for a full description of the details of construction of such a transmission and for its mode of operation, reference may be had to Patent Nos. 1,810,282 and 1,810,283 granted to me June 16, 1931. The details of the general organization of the transmission form no part of the present invention and it is to be understood that the invention is equally well applicable to many different forms of the general type of transmission to which the invention relates.

In order to reduce to a minimum the variations in the value of the reaction turning moment force transmitted to the transmission abutment through the reaction clutch, and thereby eliminate objectionable vibration in the transmission when the latter is operating asynchronously, I have provided what I will term an inertia reaction mass in the path of force transmission between the action clutch sleeve 26 and the abutment 28. This reaction inertia mass, due to its inertia and the manner in which it is mounted, acts to alter the characteristic of the force reaching the abutment by producing forces, due to the inertia of the reaction mass, which oppose the reaction turning moments transmitted by the clutch sleeve 26. The manner in which the resiliently mounted inertia mass accomplishes this function is fully set forth in United States Patent No. 1,810,283 hereinabove referred to and reference may be had thereto for a more detailed exposition of the principle involved.

In the present embodiment of the invention an improved result is obtained by dividing the inertia mass into a plurality of separate parts relatively movable with respect to each other and resiliently connected to each other in series with respect to the line of force transmission from the reaction clutch to the abutment of the transmission.

Turning again to Fig. 1, a preferred arrangement of such an inertia mass is illustrated in which the inertia mass is divided into two parts, 36 and 37. The part 36 comprises an annular cup-shaped member rotationally fixed with respect to the sleeve 26 by means of the connecting member 38. Fixed to this member is a plurality of peripherally spaced axially projecting pins 39 having mounted thereon anchoring members 40 for the inner ends of a plurality of radially arranged coil springs 41.

The outer ends of springs 41 are supported by hangers 42 mounted on the projecting ends of a series of axially extending pins 43 which, as will be seen from Fig. 1, advantageously pass through suitable holes in the annular part 37.

Part 37 is provided with a plurality of peripherally spaced openings 44 through which the pins 43 pass and mounted around the pins in these openings are a series of spring hangers 45 to which the outer ends of a second series of radially arranged springs 46 are secured. The inner ends of springs 46 are held by hangers 47 mounted on axially extending pins 48 projecting from an annular member 49 rotatably supported as by means of bearing 50 within a second annular member 51. Member 51 is fixed to the transmission casing by means of a plurality of radially arranged studs, one of which is shown in Fig. 1 at 52.

Member 49 is provided with a ring of projecting gear teeth 53 adapted to be engaged in normal operation of the transmission by cooperating teeth on the end of a lever 54 which lever is fixed against turning movement with respect to the casing of the transmission. During normal operation of the transmission, member 49 is fixed against turning movement and may therefore be considered as a part of the abutment provided by the transmission casing.

The path of force transmission from sleeve 26 to the abutment is serially through the member 38, pins 39, springs 41, pins 43 and springs 46 to the non-turnable member 49, the latter, by way of the cooperating gear teeth and lever 54, being in direct force transmitting relation with the transmission casing 28.

Since the pins 43 are fixed in the part 37 and the pins 40 are fixed in the part 36, these two parts, together constituting the inertia mass, are evidently serially connected in the path of force transmission, part 37 being resiliently secured to the abutment through the medium of the radial springs 46 and parts 36 and 37 being resiliently connected with respect to each other through the medium of springs 41.

In order to make the relation of these parts more clear I have shown in Fig. 3, in diagrammatic form, an arrangement of parts which is functionally the same as is the arrangement in the constructional example shown in Figs. 1 and 2.

Turning now to Fig. 3, the part 36′ corresponds to part 36 in Fig. 1 and part 37′ corresponds to part 37 in Fig. 1. Part 36′ is adapted to be rigidly connected to the reaction clutch sleeve of the transmission and parts 36′ and 37′ are resiliently connected to each other by means of a plurality of radially arranged springs 41′ corresponding to springs 41 in Fig. 1. Part 37′ is connected to member 49′ by means of a second series of radially arranged springs 46′ and member 49′ is shown as being provided with a plurality of teeth 53′ adapted to be engaged by a suitable fixed member such as member 54 in Fig. 1, to prevent rotational movement of member 49′.

The operation of the divided inertia mass arrangement just described is in principle similar to the operation of the single mass disclosed in Patent No. 1,810,283, already referred to, and it is not believed necessary to describe the principle of the mode of operation in detail herein.

In the present embodiment, when a counter-clockwise turning moment is transmitted from the reaction clutch (assuming that the transmission is set for clockwise or forward drive as viewed in Fig. 3) to the part 36′, the inertia of this part is overcome and the part is moved in counter-clockwise direction against the action of springs 41′, which in turn must overcome the inertia of the second part 37' before movement of this part causes any force to reach the abutment member 53' through springs 46'. It will thus be seen that the force due to the turning moment is absorbed in overcoming the inertia of the parts of the inertia mass and the parts of the inertia mass are, due to the forces transmitted thereto by the reaction turning moments, set into oscillating motion, which motion is in out-of-phase relation to the reaction turning moment forces. The inertia of these parts is accordingly utilized, in effect, to alter the intermittent character of the reaction turning moments which would otherwise be transmitted to the transmission casing and to transmit thereto a relatively constant reaction force, the value of which is represented by the mean displacement of the parts of the inertia mass from the positions of rest shown in Figs. 2 and 3.

While in the preferred embodiment herein illustrated by way of example, I have shown the inertia mass as divided into two parts serially connected in the path of force transmission, it will be evident that the number of parts used may be varied within the scope of the invention and that the specific arrangement of the parts may be widely varied without departing from the invention.

What I claim is:—

1. A variable-speed power transmission comprising a driving member, a driven member, an abutment, inertia mass resiliently connected to the abutment, said mass comprising a plurality of parts resiliently connected to each other, mechanism actuated by the driving member for alternately producing turning moments of opposite sense, and mechanism for transmitting the said opposite turning moments to the driven member and to one of said parts respectively.

2. A variable-speed power transmission comprising a driving member, a driven member, an abutment, inertia mass comprising a plurality of parts, a series of radially arranged springs for resiliently connecting one of said parts to the abutment, a second series of radially arranged springs for resiliently connecting said parts to each other, mechanism actuated by the driving member for alternately producing turning moments of opposite sense, and mechanism for transmitting said opposite turning moments to said driven member and to one of said parts respectively.

3. A variable-speed power transmission comprising a driving member, a driven member, an abutment, mechanism actuated by the driving member for alternately producing turning moments of opposite sense, mechanism comprising means for transmitting turning moments of one sense to the driven member and a reaction clutch for directing turning moments of the opposite sense toward said abutment, inertia mass between said clutch and said abutment, said mass comprising a first part rigidly connected to said clutch and a second part between said first part and the abutment, and means for resiliently connecting said second part to said first part and to said abutment.

4. A variable-speed power transmission comprising a driving member, a driven member, an abutment, mechanism actuated by the driving member for alternately producing turning moments of opposite sense, mechanism comprising means for transmitting turning moments of one sense to the driven member and a reaction clutch for directing turning moments of the opposite sense toward said abutment, inertia mass between said clutch and said abutment, said mass comprising a first part rigidly connected to said clutch, a second part between said first part and the abutment, a series of radially arranged springs for resiliently connecting said parts, and a second series of radially arranged springs for resiliently connecting said second part to said abutment.

In testimony whereof I have hereunto affixed my signature.

FREDRIK LJUNGSTROM.